United States Patent [19]

Tessmer et al.

[11] Patent Number: 5,229,909
[45] Date of Patent: Jul. 20, 1993

[54] SURGE SUPPRESSION AND FAULT CONTAINMENT CIRCUIT AND PACKAGING THEREFOR

[75] Inventors: Earl J. Tessmer; Andy A. Huan, both of Cedar Rapids, Iowa

[73] Assignee: Square D Company, Palatine, Ill.

[21] Appl. No.: 654,848

[22] Filed: Feb. 13, 1991

[51] Int. Cl.⁵ .............................................. H02H 9/00
[52] U.S. Cl. .................................... 361/104; 361/55; 361/56; 361/103; 361/111
[58] Field of Search .................... 361/55, 56, 103, 104, 361/111

[56] References Cited

U.S. PATENT DOCUMENTS

| | | | |
|---|---|---|---|
| 3,527,985 | 10/1967 | Brown | 361/56 |
| 3,968,472 | 7/1976 | Taylor | 361/56 |
| 4,038,584 | 7/1977 | Tarchalski | 361/104 |
| 4,089,032 | 5/1978 | Dell'Orfano | 361/56 |
| 4,114,054 | 9/1978 | Seo et al. | 361/56 |
| 4,408,248 | 10/1983 | Bulley et al. | 361/111 |
| 4,554,609 | 11/1985 | Ruehl et al. | 361/119 |
| 4,626,834 | 12/1986 | Caruthers | 361/56 |
| 4,654,743 | 3/1987 | Ruehl et al. | 361/111 |
| 4,979,071 | 12/1990 | Ito et al. | 361/56 |
| 5,014,156 | 5/1991 | Bruch et al. | 361/104 |

Primary Examiner—Steven L. Stephan
Assistant Examiner—Thomas M. Dougherty
Attorney, Agent, or Firm—Larry I. Golden; Kareem M. Irfan

[57] ABSTRACT

There is provided a circuit that protects the electronic tripping circuitry of a circuit breaker system from external transient high voltages and prolonged high voltage faults. The circuit preferably includes a transzorb that conducts in response to receiving a voltage signal having a magnitude greater than the breakdown voltage of the transzorb. This transzorb clamps the output voltage to its breakdown voltage. The circuit also includes a fuse that is designed to blow in response to a prolonged high voltage fault.

10 Claims, 2 Drawing Sheets

SURGE SUPPRESSION AND FAULT CONTAINMENT CIRCUIT AND PACKAGING THEREFOR

BACKGROUND OF THE INVENTION

1. Field of the Invention

The present invention relates generally to a protection circuit and, more particularly, to a circuit that protects other circuits from high voltage transients and prolonged high voltage faults.

2. Description of the Related Art

In electric power distribution systems, circuit breakers are used to protect power lines and other distribution equipment from excessive current flows which tend to overheat and damage current conductors. Circuit breakers carry and monitor the current flowing through the power distribution lines. When the current reaches an undesirably high level in a particular line, a tripping device associated with the circuit breaker interrupts current flow in the power line, usually by energizing an electromagnetic relay connected in series with the line. Each circuit breaker includes current monitoring circuitry, trip determination circuitry, and circuitry to power the tripping device. Moreover, many circuit breakers used in industrial applications offer sophisticated delay circuitry to maximize power dissipation and to prevent unnecessary tripping, alarm or annunciation circuitry, and other types of fault detection circuitry, such as circuitry for ground fault detection.

A power supply is needed to provide adequate power to the circuitry of the circuit breaker for proper operation. Since circuit breakers monitor the power in the distribution lines, power is conveniently drawn from the distribution lines to provide power for the power supply. Circuit breakers of this type are commonly referred to as "fault-powered" circuit breakers. Advantageously, fault-powered circuit breakers operate over a wide range of line current to ensure proper operation of the circuit breaker. For instance, under ground fault conditions, when current is drawn from the line through an external conductor, such as when the conductor comes into contact with a motor casing, the line current is low. However, the power supply must still be able to adequately power its associated circuitry and the tripping relay in order to isolate the affected power line and prevent the ground fault from causing damage. Antithetically, a "short" circuit may produce currents in the power line which are many times greater than the rating of the line. To prevent damage caused by this type of severe overcurrent condition, the power supply contains surge protection so that it continues providing power to the associated circuitry and to the tripping relay in order to isolate the affected power line and prevent damage to the power line and any peripheral devices.

While fault-powered circuit breakers offer many advantages over externally powered circuit breakers, they also present some drawbacks. For instance, some fault-powered circuit breakers cannot provide adequate power particularly during low current situations. At such times the available power is insufficient to energize electromagnetic tripping relays which draw a significant amount of power during actuation. Therefore, an external power supply is coupled to the tripping circuitry. During low current situations, the tripping circuitry draws power from the external supply and, thus, receives adequate power to remain fully functional.

Unfortunately, external power supplies may exhibit spurious high voltage transients, which are typically less than one millisecond in duration. One of these high voltage transients, if received by the electronic tripping circuitry, can produce a malfunction or damage the tripping circuitry. Additionally, external power supplies can experience a high voltage, high energy catastrophic fault. Such a fault delivers a high voltage of long duration to the tripping circuitry. Of course, a prolonged exposure to high voltage will almost surely damage the tripping circuitry.

To complicate matters further, the space allocated to electronic tripping circuitry in circuit breakers makes it difficult to package enhanced functionality accessories in the available space. Thus, a problem arises regarding the placement of protective circuitry, such as fault protection circuitry to solve the problems mentioned above.

The present invention is directed to overcoming, or at least minimizing, one or more of the problems set forth above.

SUMMARY OF THE INVENTION

In accordance with one aspect of the present invention, there is provided a circuit for suppressing voltage transients and for containing voltage faults. The circuit includes an input node adapted for receiving an input voltage and an output node adapted for delivering an output voltage. A first element is adapted for receiving the input voltage and for clamping the output voltage to a preselected voltage in response to the input voltage having a voltage transient having a magnitude greater than the preselected voltage. A second element is adapted for receiving current generated by the input voltage and for preventing delivery of the output voltage in response to the input voltage exceeding the preselected voltage for by a given magnitude for a given time.

In accordance with another aspect of the present invention, there is provided a circuit for suppressing voltage transients and for containing voltage faults. The circuit includes a first input terminal, a second input terminal, a first output terminal and a second output terminal. The input terminals are adapted for receiving an input voltage signal therebetween, and the output terminals are adapted for delivering an output voltage signal therebetween. A first transzorb has a cathode coupled to the first input terminal and an anode coupled to the second input terminal. A resistor has a first lead coupled to the first input terminal. A fuse is coupled between the second lead of the resistor and the first output terminal. A blocking diode has a cathode coupled to the second input terminal and an anode coupled to the second output terminal. A second transzorb has a cathode coupled to the first output terminal and an anode coupled to the anode of the blocking anode.

In accordance with yet another aspect of the present invention, there is provided a method for packaging a circuit that enhances the functionality of a circuit breaker system. The method includes the step of coupling the enhancing circuit to a cable having a first end and a second end. The first end of the cable is adapted for coupling to the circuit breaker system, and the second end of the cable is adapted for coupling to a circuit external to the circuit breaker system.

BRIEF DESCRIPTION OF THE DRAWINGS

The foregoing and other advantages of the invention will become apparent upon reading the following detailed description and upon reference to the drawings in which.

Figure 1:
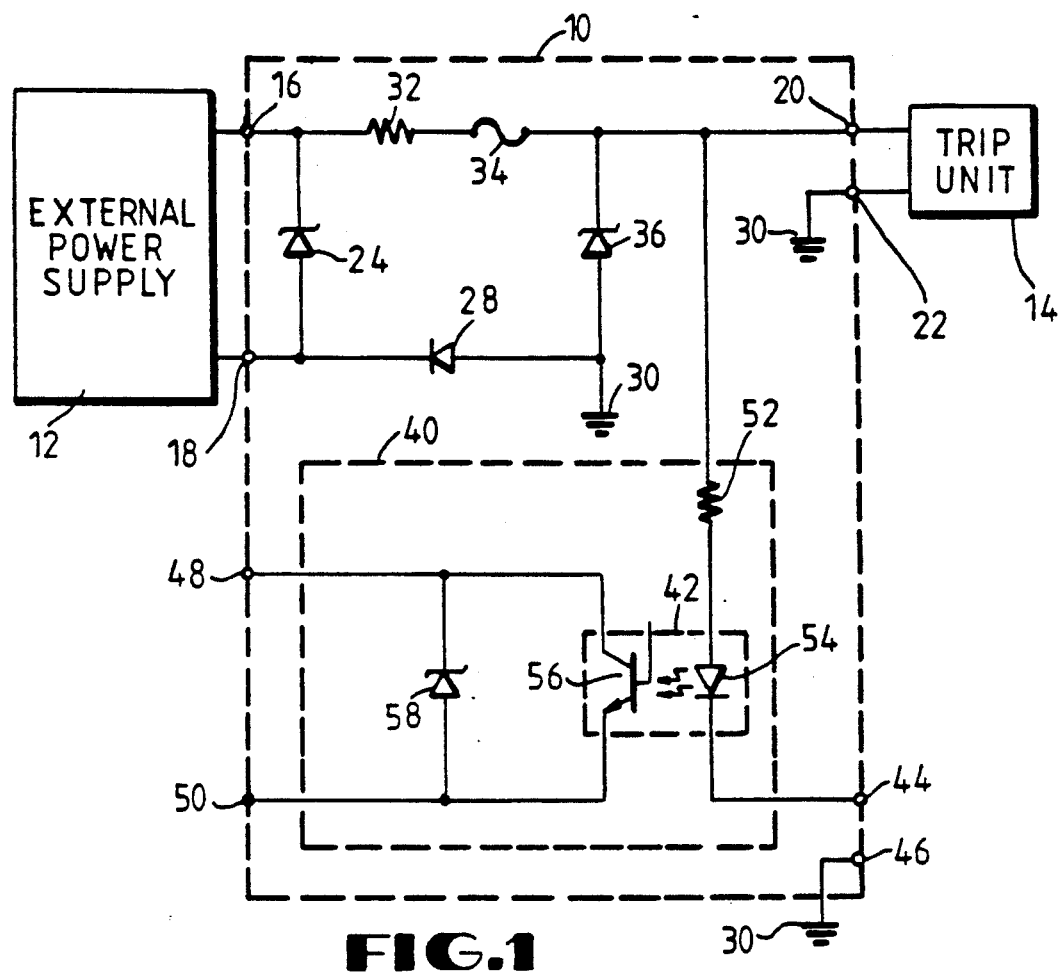
FIG. 1 schematically illustrates a surge suppression and fault containment circuit in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

In the overall operation of a power distribution system, circuit breakers are typically used to protect the power lines which service each circuit. The power lines in each circuit are designed and rated to safely transmit a predetermined amount of power. When peripheral devices begin to draw more power than the power lines are designed to transfer, the circuit breakers interrupt current flowing in the affected power lines to prevent damage to those lines, usually by energizing an electromagnetic relay. The resulting open circuit effectively interrupts current flow to the peripheral devices so that they cannot continue to draw excessive current through the lines. Preferred circuit breaker systems are available from Square D Company of Cedar Rapids, Iowa.

Turning now to the drawings and referring initially to FIG. 1, a surge suppression and fault containment circuit is illustrated and generally designated by a reference numeral 10. The circuit 10 effectively suppresses voltage transients and prevents longer duration voltage surges from damaging circuit breaker systems, such as the systems mentioned above. The circuit 10 couples an external power supply 12 to a trip unit 14 of a circuit breaker system and, thus, protects the trip unit 14 from both high energy transients and high energy catastrophic faults introduced by the power supply 12.

The power supply 12 is coupled to the terminals 16 and 18 of the circuit 10. The terminal 16 couples to the positive lead of the power supply 12, which is commonly at about 9 volts d.c., and the terminal 18 couples to the ground lead of the power supply 12. Similarly, the trip unit 14 is coupled to the terminals 20 and 22 of the circuit 10. The terminal 20 couples to the positive lead of the trip unit 14, and the terminal 22 couples to the ground lead of the trip unit 14.

Once connected between the power supply 12 and the trip unit 14, the circuit 10 normally transmits the voltage across the terminals 16 and 18, referred to hereinafter as the input voltage, to the trip unit 14. However, if the input voltage experiences a high voltage transient, the circuit 10 clamps the input voltage to a predetermined level and, thus, prevents the high voltage transient from reaching the trip unit 14.

To suppress a high voltage transient, the circuit 10 includes a transzorb 24 connected across the input terminals 16 and 18. A transzorb is a high speed, high energy zener diode, and is sometimes referred to as a transient absorbing zener diode. As will become apparent from the following discussion, a transzorb is used instead of a normal zener diode because a transzorb is capable of switching quickly in response to receiving spurious high voltage transients.

The cathode of the transzorb 24 is coupled to the input terminal 16, and the anode of the transzorb 24 is coupled to the input terminal 18. Like most zener diodes, the transzorb 24 conducts current from its anode to its cathode when a small positive voltage is applied between the anode and the cathode, but a much larger positive voltage must be applied between the cathode and the anode for the transzorb to conduct current from its cathode to its anode. This large voltage is typically referred to as a breakdown voltage. When the input voltage exceeds the breakdown voltage of the transzorb 24, the transzorb 24 conducts current from the input terminal 16 to the input terminal 18. As a result, the transzorb 24 clamps the input voltage to the breakdown voltage. Preferably, the transzorb 14 is rated at 1.5 kilojoules, has a breakdown voltage of 15 volts, and is available from General Semiconductor of Tempe, Ariz.

The circuit 10 also protects the trip unit 14 from a prolonged high voltage fault appearing across the input terminals 16 and 18. In fact, the circuit 10 is designed to systematically destroy itself to interrupt and contain the fault energy. When the input voltage exceeds the breakdown voltage of the transzorb 24, the transzorb 24 turns on and clamps the input voltage to the breakdown voltage, as explained previously with respect to a transient high voltage. Thus, the transzorb 24 initially dissipates the excess energy generated by the high voltage fault, while continuing to deliver a suitable output voltage across terminals 20 and 22 to the trip unit 14.

If the high voltage fault is sufficiently long in duration, the fault energy may exceed the dissipation capability of the transzorb 24. Therefore, the high voltage fault will eventually destroy the transzorb 24, and the destroyed transzorb 24 creates an open circuit. To ensure that no fault current enters the circuit 10 via a return path, a blocking diode 28 has its cathode coupled to the input terminal 18 and it anode coupled to the circuit ground 30, i.e., the second output terminal 22.

When the transzorb 24 becomes an open circuit, the high voltage produced by the fault drops across a current limiting resistor 32, a fuse 34, a second transzorb 36, and the blocking diode 28. These elements are serially connected one to the other between the input terminals 16 and 18. It should also be noted that the cathode of second transzorb 36 is coupled to the output terminal 20 and the anode of the second transzorb 36 is coupled to the circuit ground 30. Thus, when the high fault voltage exceeds the breakdown voltage of the second transzorb 36, the transzorb 36 functions much like the transzorb 24 functioned initially and begins to conduct current. When the second transzorb 36 conducts current, it completes a current path from the input terminal 16 to the input terminal 18 so that current flows through the current limiting resistor 32, the fuse 34, the second transzorb 36, and the blocking diode 28. This current path shunts the fault current away from the output terminals 20 and 22 and, instead, returns the current to the source of the fault via the blocking diode 28.

If the high current produced by the high voltage fault exceeds the current rating of the fuse 34, the high current will destroy the fuse 34 and, thus, create an open circuit. The current rating of the fuse 34 is given by an $I^2t$ characteristic where I equals the magnitude of the current flowing through the fuse 34 and t equals the time that the fuse carries the current. Therefore, the greater the current flowing through the fuse 34, the quicker the current will destroy the fuse 34. With the fuse 34 destroyed, the high energy produced by the fault cannot reach the trip unit 14. Therefore, the circuit 10 has completely contained the fault and protected the trip unit 14.

It should be appreciated that the breakdown voltage of the second transzorb 36 is advantageously higher than the breakdown voltage of the first transzorb 24. Preferably, the breakdown voltage of the second transzorb 36 is 20 volts. Selecting the breakdown voltage of the second transzorb 36 to be higher than the breakdown voltage of the first transzorb 24 ensures that the first transzorb 24 will conduct current first in response to a high input voltage. If so, then the circuit 10 continues to transmit power to the trip unit 14 while the first transzorb 24 suppresses the high input voltage. Otherwise, the second transzorb 36 could turn on first and cause the fuse 34 to blow in response to a high voltage transient rather than a prolonged high voltage fault. While the circuit 10 would still protect the trip unit 14 from harm, it would not continue to transmit power to the trip unit 14.

It should be understood, however, that a high voltage fault could be long enough to destroy the transzorb 24, but not long enough to destroy the fuse 34. In this situation, it would be desirable if the circuit 10 continued to deliver the input voltage to the trip unit 14, and to continue to protect the trip unit 14 from high voltage transients and prolonged high voltage faults. Of course, the circuit 10 would continue to protect the trip unit 14 from prolonged high voltage faults as just described. But, in addition, the second transzorb 36 would suppress spurious high voltage transients in much the same way a the transzorb 24 did until it was destroyed. In other words, when a high voltage transient exceeds the breakdown voltage of the second transzorb 36, the second transzorb 36 begins to conduct current and, thus, clamps the output voltage to the breakdown voltage.

The selection of a transzorb for element 36 provides this additional advantage of continued transient suppression, even though the transzorb 24 has been destroyed by a previous high voltage fault. This advantage can be appreciated by recognizing that a normal zener diode could be substituted for the second transzorb 36. If so, it would not inhibit the ability of the circuit 10 to satisfactorily protect the trip unit 14 from a prolonged high voltage fault. However, if a situation arises where the transzorb 24 is destroyed, but the fuse 34 is not, then a normal zener diode may not be able to switch fast enough to adequately protect the trip unit 14 from spurious high voltage transients.

Preferably, the circuit 10 also provides a communicating circuit 40 that transmits serial data from the trip unit 14. An opto-isolator 42 transmits the data from input ports 44 and 46 of the trip unit 14 to output ports 48 and 50. The opto-isolator 42 also isolates the trip unit 14 from any circuits coupled to the output ports 48 and 50. The input ports 44 and 46 are preferably coupled to an open collector asynchronous data stream from the trip unit 14. As illustrated, the opto-isolator 42 has its cathode coupled to the input port 44 and its anode coupled to a resistor 52. The resistor 52, in turn, is coupled to the output terminal 20. The opto-isolator 42 contains a light emitting diode (LED) 54, and the resistor 52 limits current through the LED 54.

When a data signal is a logic "0", current flows through the opto-isolator 42 and the resistor 52. The current produces a light pulse from the LED 54 which causes a transistor 56, which is optically coupled to the LED 54, to conduct. When the transistor 56 conducts, the logic "0" data signal is coupled to the output ports 48 and 50 via the collector and emitter, respectively, of the transistor 56. Conversely, when a data signal is a logic "1", current does not flow through the opto-isolator 42 or the resistor 52. Therefore, the LED 54 does not light and the transistor 56 does not conduct, and the logic "1" data signal is coupled to the output ports 48 and 50.

The output ports 48 and 50 are coupled together by a transzorb 58. The cathode of the transzorb 58 is coupled to the output port 48, and the anode of the transzorb 58 is coupled to the output port 50. The transzorb 58 suppresses voltage transients on the data signals that exceed its breakdown voltage. In addition, if a high voltage transient or fault should appear across the output ports 48 and 50, the opto-isolator 42 will protect the trip unit 14 by preventing a transfer of this high energy to the trip unit 14.

Figure 2:
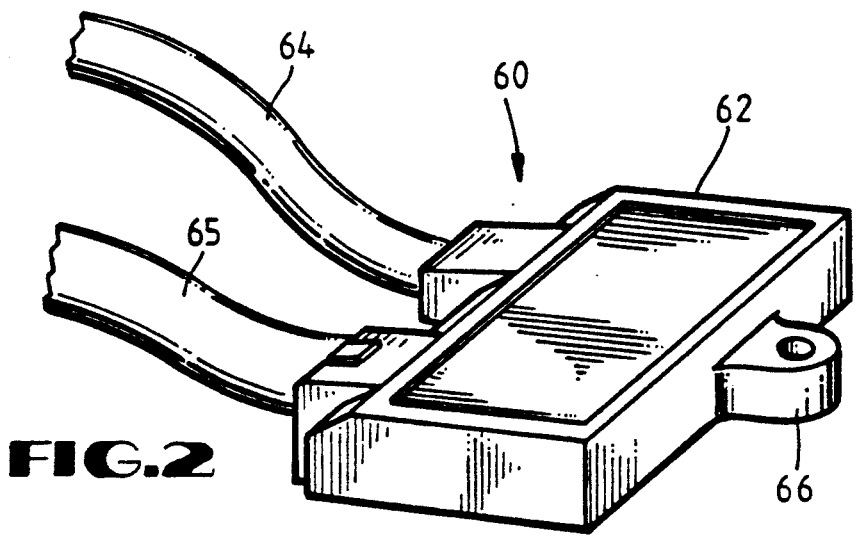
FIG. 2 illustrates a perspective view of a circuit packaging arrangement, especially for use with circuit breakers.
Figure 3:
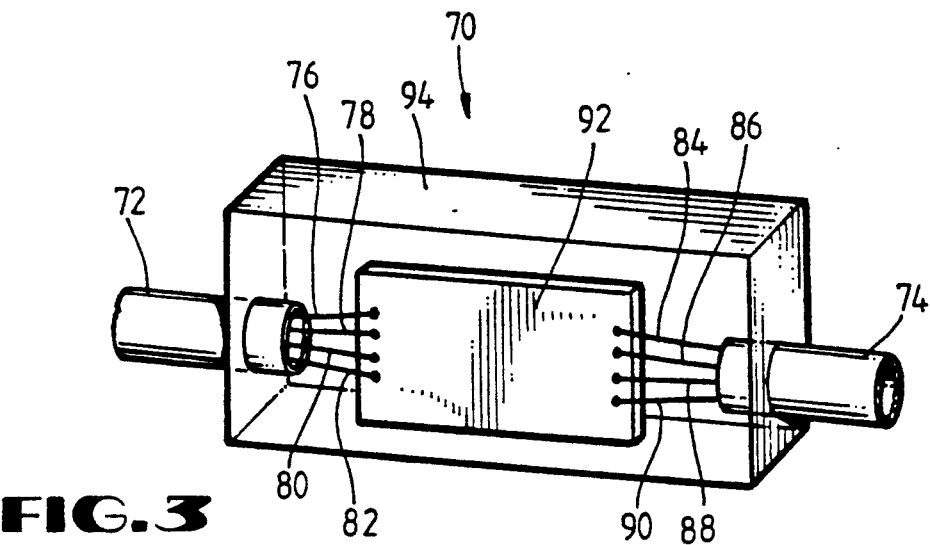
FIG. 3 illustrates a perspective view of another circuit packaging arrangement, especially for use with circuit breakers.
Figure 4:
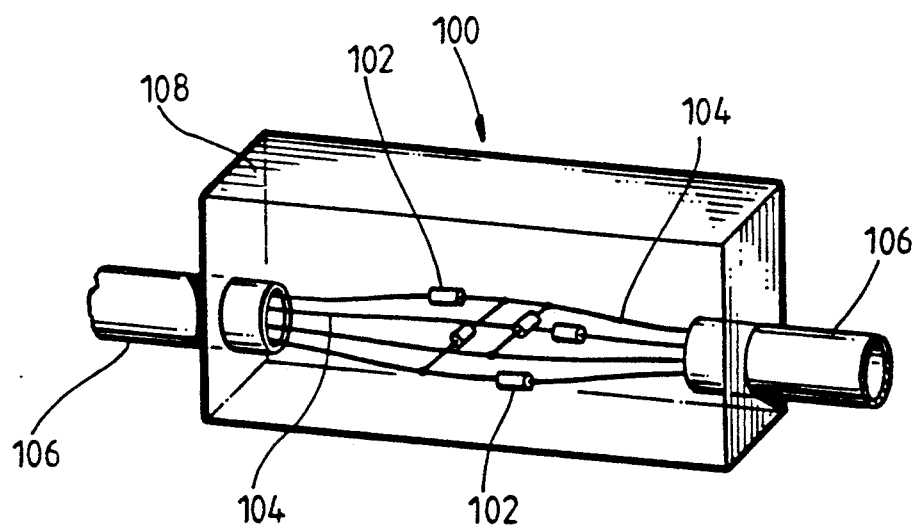
FIG. 4 illustrates a side view of yet another circuit packaging arrangement, especially for use with circuit breakers.

As mentioned previously, the space allocated to electronic tripping systems, like the trip unit 14, in circuit breaker systems sometimes makes it difficult to package additional circuitry within the breaker system. Therefore, additional circuits that enhance the functionality of the circuit breaker system, such as the circuit 10 described herein, are preferably packaged into a cable assembly 60, 70 or 100 as illustrated in FIGS. 2-4, respectively. The packaging of these enhancing circuits into a cable assembly 60 external to the circuit breaker allows for inexpensive replacement, addition or exchange of these enhancing circuits. For instance, if the circuit 10 becomes damaged in response to a fault condition, the cable assembly 60, 70 or 100 can be quickly and easily detached from the trip unit 14 and replaced with another cable assembly 60, 70 or 100 carrying a functional circuit 10.

As illustrated in FIG. 2, the cable assembly 60 includes a connector 62 coupled to the ends of two cables 64 and 65. Preferably, the connector 62 is a molded plastic casing that includes an integral tab 66 for mounting the connector 62 near the circuit breaker system. The connector 62 preferably contains a printed circuit board (not shown) that carries the circuit 10. The ends of the cables 64 and 65 enter the connector 62. The entering end of the cable 65 couples to the input terminals 16 and 18 and to the output ports 48 and 50, and the entering end of the cable 64 couples to the output terminals 20 and 22 and to the input ports 44 and 46. The other end of the cable 65 is coupled to the external power supply 12, and the other end of the cable 64 is coupled to the trip unit 14.

In addition, the connector 62 may be of an environmentally sealed type, or a potting compound may encase the printed circuit board within the connector 62, to protect the circuit 10 from environmental damage.

Preferably, the printed circuit board is placed in a box, and potting compound is poured in the box to seal the board. Then the plastic connector 62 is molded over the potted box.

FIG. 3 illustrates another cable assembly 70. In the cable assembly 70, the cable has been split into a first portion 72 and a second portion 74. The wires 76, 78, 80, 82, 84, 86, 88 and 90 of the cable are connected to a printed circuit board 92 which carries the circuit 10 (not illustrated). The wires 76, 78, 80 and 82 are preferably connected to the input terminals 16 and 18 and to the output ports 48 and 50, respectively. The wires 84, 86, 88 and 90 are preferably connected to the output terminals 20 and 22 and to the input ports 44 and 46, respectively. Once connected, the printed circuit board 92, the wires 76, 78, 80, 82, 84, 86, 88 and 90, and a portion of the first and second portions 72 and 74 of the cable are covered with a potting material 94 to environmentally protect the circuit 10.

FIG. 4 illustrates yet another cable assembly 100 incorporating an enhancing circuit for a circuit breaker system. The cable assembly 100 is quite similar to the cable assembly 70 except that, instead of mounting the elements of the circuit 10 onto a printed circuit board and connecting the wires of the cable to the printed circuit board, the elements (generically designated here using reference numeral 102) of the circuit 10 are coupled directly to the wires 104 of the cable 106. Once the elements 102 have been connected to the appropriate wires 104, the elements 102, the wires 104 and a portion of the cable 106 is covered with a potting material 108 to environmentally protect the circuit 10.

We claim:

1. A circuit for suppressing voltage transients and for containing voltage faults, said circuit comprising:
   an input node adapted for receiving an input voltage and an output node adapted for delivering an output voltage;
   a first element adapted for receiving said input voltage, said first element clamping said output voltage to a first preselected voltage in response to said input voltage having a voltage transient having a magnitude greater than said first preselected voltage, said first element clamping said output voltage to said preselected voltage until said input voltage destroys said first element;
   a second element adapted for receiving current generated by said input voltage, said second element preventing delivery of said output voltage in response to said input voltage exceeding said first preselected voltage by a given magnitude for a given time;
   a third element adapted for receiving said input voltage, said third element clamping said output voltage to a second preselected voltage in response to said input voltage having a magnitude greater than said second preselected voltage said second preselected voltage being greater than said first preselected voltage; and
   an opto-isolator having a light emitting diode and an associated optically switchable transistor, said light emitting diode being coupled between said output node and a serial input node of a circuit breaker system, and said transistor being coupled to a serial output node.

2. A circuit for suppressing voltage transients and for containing voltage faults, said circuit comprising:
   a first input terminal and a second input terminal, said input terminals being adapted for receiving an input voltage signal therebetween;
   a first output terminal and a second output terminal, said output terminals being adapted for delivering an output voltage signal therebetween;
   a first transzorb having a cathode and an anode, said cathode being coupled to said first input terminal and said anode being coupled to said second input terminal, said first transzorb is adapted for clamping said output voltage signal to a first preselected voltage in response to said input voltage signal having a voltage transient having a magnitude greater than said first preselected voltage, said first transzorb clamps said output voltage signal to said preselected voltage until said input voltage signal destroys said first transzorb;
   a resistor having a first lead and a second lead, said first lead being coupled to said first input terminal;
   a fuse being coupled between said second lead of said resistor and said first output terminal, said fuse is adapted for preventing delivery of said output voltage signal in response to said input voltage signal generating a current through said fuse that exceeds a current-versus-time characteristic of said fuse;
   a blocking diode having a cathode and an anode, said cathode of said blocking diode being coupled to said second input terminal; and
   a second transzorb having a cathode and an anode, said cathode of said second transzorb being coupled to said first output terminal and said anode of said second transzorb being coupled to said anode of said blocking diode, said second transzorb is adapted for clamping said output voltage signal to a second preselected voltage in response to said input voltage signal destroying said first transzorb and having a magnitude greater than said second preselected voltage, said second preselected voltage is greater than said first preselected voltage.

3. The circuit, as set forth in claim 2, wherein the first transzorb is adapted for clamping said output voltage signal to a first preselected voltage in response to said input voltage signal having a voltage transient having a magnitude greater than said first preselected voltage.

4. The circuit, as set forth in claim 2, wherein said fuse prevents delivery of said output voltage signal after said input voltage signal destroys said first transzorb.

5. The circuit, as set forth in claim 2, further comprising:
   an opto-isolator having a light emitting diode and an associated optically switchable transistor, said light emitting diode being coupled between said first output terminal and a serial input node of a circuit breaker system, and said transistor being coupled to a serial output node.

6. The circuit, as set forth in claim 2, further comprising:
   a cable having a first end and a second end, said first end of said cable being coupled to said input terminals and said second end of said cable being coupled to said output terminals, said circuit being coupled between said first and second ends of said cable.

7. The circuit, as set forth in claim 6, further comprising:
   means for environmentally protecting said circuit.

8. The circuit, as set forth in claim 7, wherein said protecting means comprises a potting material being disposed about said circuit.

9. The circuit, as set forth in claim 7, wherein said protecting means comprises a connector being disposed about said circuit and being adapted for coupling to said cable between said first and second ends.

10. The circuit, as set forth in claim 9, wherein said connector comprises a tab coupled thereto and adapted for mounting said connector.

* * * * *